US008971318B2

(12) United States Patent
Yamada et al.

(10) Patent No.: US 8,971,318 B2
(45) Date of Patent: Mar. 3, 2015

(54) RELAY COMMUNICATION APPARATUS AND MULTISTAGE RELAY COMMUNICATION SYSTEM

(75) Inventors: Tsutomu Yamada, Hitachinaka (JP); Noritaka Matsumoto, Naka-gun (JP); Kazuya Shimoyama, Hitachi (JP); Yoshihito Sato, Hitachi (JP); May Takada, Kawasaki (JP); Masayuki Miyazaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 83 days.

(21) Appl. No.: 13/702,201

(22) PCT Filed: Jun. 11, 2010

(86) PCT No.: PCT/JP2010/059948
§ 371 (c)(1),
(2), (4) Date: Dec. 27, 2012

(87) PCT Pub. No.: WO2011/155064
PCT Pub. Date: Dec. 15, 2011

(65) Prior Publication Data
US 2013/0121238 A1    May 16, 2013

(51) Int. Cl.
*H04L 12/50* (2006.01)
*H04W 88/04* (2009.01)
*H04W 40/32* (2009.01)
(Continued)

(52) U.S. Cl.
CPC .............. *H04W 88/04* (2013.01); *H04W 40/32* (2013.01); *H04L 45/22* (2013.01); *H04L 45/24* (2013.01); *H04L 45/28* (2013.01); *H04L 45/54* (2013.01);
(Continued)

(58) Field of Classification Search
USPC .......................... 370/327, 387, 388, 406, 390
See application file for complete search history.

(56) References Cited

U.S. PATENT DOCUMENTS

| 7,545,811 | B2 * | 6/2009 | Taha ............................. 370/392 |
| 8,175,047 | B2 * | 5/2012 | Seok et al. .................... 370/329 |
| 8,498,292 | B2 * | 7/2013 | Zhou et al. .................... 370/389 |
| 2005/0249244 | A1 * | 11/2005 | McNamara et al. .......... 370/474 |
| 2008/0279181 | A1 | 11/2008 | Shake et al. |
| 2008/0310342 | A1 * | 12/2008 | Kruys et al. .................. 370/328 |

(Continued)

FOREIGN PATENT DOCUMENTS

| JP | 2003-244197 A | 8/2003 |
| JP | 2004-201032 A | 7/2004 |

(Continued)

OTHER PUBLICATIONS

Japanese Office Action received in Japanese Application No. 2012-519190 dated Oct. 29, 2013.

*Primary Examiner* — Ricky Ngo
*Assistant Examiner* — Dewanda Samuel
(74) *Attorney, Agent, or Firm* — Mattingly & Malur, PC

(57) ABSTRACT

A multistage relay communication system 100 includes a trunk network 1 and branch networks 2 (2a, 2b), each of which includes one or more communication apparatuses 4. The communication apparatus 4 can switch between a trunk mode to operate in the trunk network 1 and a branch mode to operate in the branch network 2. In the trunk network 1, the communication apparatus 4 carries out fixing of a communication path and redundancy of data based on a path table in order to achieve real-timeness and a data arrival rate. Meanwhile, in the branch network 2, when a communication failure occurs, the communication apparatus 4 autonomously searches for a communication path and constructs a path table, in order to at least secure a data arrival rate even if real-timeness is impaired within an allowable range.

10 Claims, 11 Drawing Sheets

(51) Int. Cl.
*H04L 12/707* (2013.01)
*H04L 12/703* (2013.01)
*H04L 12/741* (2013.01)
*H04W 24/04* (2009.01)
*H04W 84/04* (2009.01)
*H04B 7/155* (2006.01)

(52) U.S. Cl.
CPC ............ *H04W 24/04* (2013.01); *H04W 84/047* (2013.01); *H04B 7/155* (2013.01)
USPC ............ 370/387; 370/388; 370/390; 370/406

(56) References Cited

U.S. PATENT DOCUMENTS

2009/0319664 A1   12/2009   Tajima et al.

FOREIGN PATENT DOCUMENTS

| JP | 2004-274703 A | 9/2004 |
| JP | 2005-236632 A | 9/2005 |
| JP | 2005-354626 A | 12/2005 |
| JP | 2006-174406 A | 6/2006 |
| JP | 2010-028777 A | 2/2010 |

* cited by examiner

| TRANS-MITTING DEVICE (70) | RECEIVING DEVICE (71) | ADR1 (RA) (53) | ADR2 (TA) (54) | ADR3 (MDA) (55) | ADR4 (MSA) (57) | ADR5 (DA) (62) | ADR6 (SA) (63) | |
|---|---|---|---|---|---|---|---|---|
| PC1 | M2 | N/P | N/P | N/P | N/P | PC2 | PC1 | ~80 |
| M2 | M1 | M1 | M2 | M1 | M2 | PC2 | PC1 | ~81 |
| M1 | B1 | B1 | M1 | N/A | N/A | PC2 | PC1 | ~82 |

(b)

| TRANS-MITTING DEVICE | RECEIVING DEVICE | ADR1 (RA) | ADR2 (TA) | ADR3 (MDA) | ADR4 (MSA) | ADR5 (DA) | ADR6 (SA) | |
|---|---|---|---|---|---|---|---|---|
| B1 | B2 | B2 | B1 | B4 | B1 | PC2 | PC1 | ~83 |
| B2 | B3 | B3 | B2 | B4 | B1 | PC2 | PC1 | ~84 |
| B3 | B4 | B4 | B3 | B4 | B1 | PC2 | PC1 | ~85 |

(c)

| TRANS-MITTING DEVICE | RECEIVING DEVICE | ADR1 (RA) | ADR2 (TA) | ADR3 (MDA) | ADR4 (MSA) | ADR5 (DA) | ADR6 (SA) | |
|---|---|---|---|---|---|---|---|---|
| B1 | B5 | B5 | B1 | B4 | B1 | PC2 | PC1 | ~86 |
| B5 | B6 | B6 | B5 | B4 | B1 | PC2 | PC1 | ~87 |
| B6 | B4 | B4 | B6 | B4 | B1 | PC2 | PC1 | ~88 |

(d)

| TRANS-MITTING DEVICE | RECEIVING DEVICE | ADR1 (RA) | ADR2 (TA) | ADR3 (MDA) | ADR4 (MSA) | ADR5 (DA) | ADR6 (SA) | |
|---|---|---|---|---|---|---|---|---|
| B4 | M5 | M5 | B4 | N/A | N/A | PC2 | PC1 | ~89 |
| M5 | M6 | M6 | M5 | M6 | M5 | PC2 | PC1 | ~90 |
| M6 | PC2 | N/P | N/P | N/P | N/P | PC2 | PC1 | ~91 |

FIG. 6

| DA | MDA | RA | END POINT FLAG | I/F | |
|---|---|---|---|---|---|
| PC2 | B4 | | | | ~210 |
| PC1 | | M1 | | wlan0 | ~211 |
| B4 | | B2 | Yes | wlan1 | ~212 |
| B4 | | B5 | Yes | wlan2 | ~213 |
| B3 | | B2 | | wlan1 | ~214 |
| B6 | | B5 | | wlan2 | ~215 |

| DA | MDA | RA | END POINT FLAG | I/F | |
|---|---|---|---|---|---|
| PC2 | B24 | | | | 260 |
| PC1 | | B11 | | eth0 | 261 |
| B24 | | B22 | Yes | wlan1 | 262 |
| B24 | | B25 | Yes | wlan2 | 263 |
| B23 | | B22 | | wlan1 | 264 |
| B26 | | B25 | | wlan2 | 265 |
| M21 | B27 | | | | 266 |
| B27 | | B22 | Yes | wlan1 | 267 |
| B27 | | B25 | Yes | wlan2 | 268 |

| DA | MDA | RA | END POINT FLAG | I/F | |
|---|---|---|---|---|---|
| PC1 | M2 | | | | 280 |
| PC2 | | B1 | | wlan0 | 281 |
| M2 | | M3 | Yes | wlan1 | 282 |
| M2 | | M4 | Yes | wlan2 | 283 |

RELAY COMMUNICATION APPARATUS AND MULTISTAGE RELAY COMMUNICATION SYSTEM

TECHNICAL FIELD

The present invention relates to a relay communication apparatus which is connected in multiple stages between a terminal transmitting data and a terminal receiving the data and relays the data, and a multistage relay communication system.

BACKGROUND ART

In a multihop communication system, a relay communication apparatus (hereinafter also referred to simply as a communication apparatus) is connected in multiple stages between a terminal transmitting data and a terminal receiving the data and the data is transmitted via the communication apparatus. The communication apparatus has a wireless communication interface or a wired communication interface and transfers data wirelessly or via a wire. Thus, the multihop communication system is seen as promising as a technique to reduce communication wiring costs with the use of wireless communication in industrial fields such as production control systems.

According to the multihop communication system described in Patent Document 1, selecting plural communication paths having least radio frequency interference to a terminal of a data destination is disclosed. A communication apparatus constituting a communication path transmits and receives information about network topology and information of intensity of received radio waves to and from other communication apparatuses, and plural communication paths having little radio frequency interference are decided. The effect and advantage thereof is to increase communication throughput and reduce deterioration in network quality.

According to the multihop communication system described in Patent Document 2, constructing communication paths to a terminal of a data destination in the form of main and sub communication paths and switching to the sub communication path when a communication failure occurs in the main communication path is disclosed. Then, after the occurrence of the communication failure in the main communication path, data to be transmitted to the destination is resent using the sub communication path. The effect and advantage thereof is to prevent data from becoming missing, that is, improve data arrival rate.

RELATED ART DOCUMENTS

Patent Documents

Patent Document 1: JP-A-2005-236632
Patent Document 2: JP-A-2005-354626

SUMMARY OF THE INVENTION

Problems that the Invention is to Solve

In a communication system used in industrial fields such as production control systems, real-timeness (that data arrives within a predetermined time period that is designed) and data arrival rate are important factors. The communication system is used to gather information about the operating status of a manufacturing device, the amounts of materials left and the like, and immediately feed the gathered information back to control. Also, it is not uncommon that the communication system continues being used over a long period of 10 years or longer after the construction. Therefore, there is a problem that the communication environment surrounding the communication system changes, causing reduction in real-timeness and data arrival rate.

When a wireless communication system using communication apparatus with a wireless communication interface is introduced, the communication apparatus is initially installed at an optimum place at the time of introduction. However, as time goes by, walls, structures, fixtures and the like are extended or rebuilt and the wireless communication environment thus changes. Also, it is not uncommon that a new communication apparatus is added or a communication apparatus with different performance is substituted. Consequently, wireless communication is blocked because of interception of radio waves and radio frequency interference from another communication apparatus. Then, a problem of reduction in real-timeness and data arrival rate occurs.

When trying to solve such problems, the technique disclosed in Patent Document 1 has a problem that real-timeness in the communication system as a whole cannot be secured because communication paths having little radio frequency interference are selected. Meanwhile, the technique disclosed in Patent Document 2 has a problem that the real-timeness cannot be secured because data is resent using the sub communication path after a failure in the main communication path is detected.

Thus, an object of the invention is to provide a relay communication apparatus and a multistage relay communication system in which real-timeness and a high data arrival rate can be maintained.

Means for Solving the Problems

To solve the foregoing problems, a multistage relay communication system includes a trunk network and a branch network, each of which includes one communication apparatus or more. The communication apparatus can switch between a trunk mode to operate in the trunk network and a branch mode to operate in the branch network. In the trunk network, in order to achieve real-timeness and a data arrival rate, the communication apparatus fixes a communication path and carries out redundancy of data based on a path table (information about communication paths). Meanwhile, in the branch network, when a communication failure occurs, the communication apparatus autonomously searches for a connectable communication path and constructs a communication path, in order to at least secure a data arrival rate even if real-timeness is impaired within an allowable range.

Advantages of the Invention

According to the invention, a relay communication apparatus and a multistage relay communication system in which real-timeness and a high data arrival rate can be maintained.

BRIEF DESCRIPTION OF THE DRAWINGS

FIG. 5 It is a view showing an example of transition of address fields of a communication frame. (a) shows address fields of a communication frame in a transmitting-side branch network. (b) and (c) show address fields of a communication frame in a trunk network. (d) shows address fields of a communication frame in a receiving-side branch network.

FIG. 6 It is a view showing an example of a path table of communication apparatuses arranged in a trunk network.

FIG. 12 It is a view showing an example of a path table of communication apparatuses arranged in a trunk network according to the second embodiment.

FIG. 13 It is a view showing an example of a path table of communication apparatuses arranged in a branch network according to a third embodiment.

MODE FOR CARRYING OUT THE INVENTION

Figure 1:
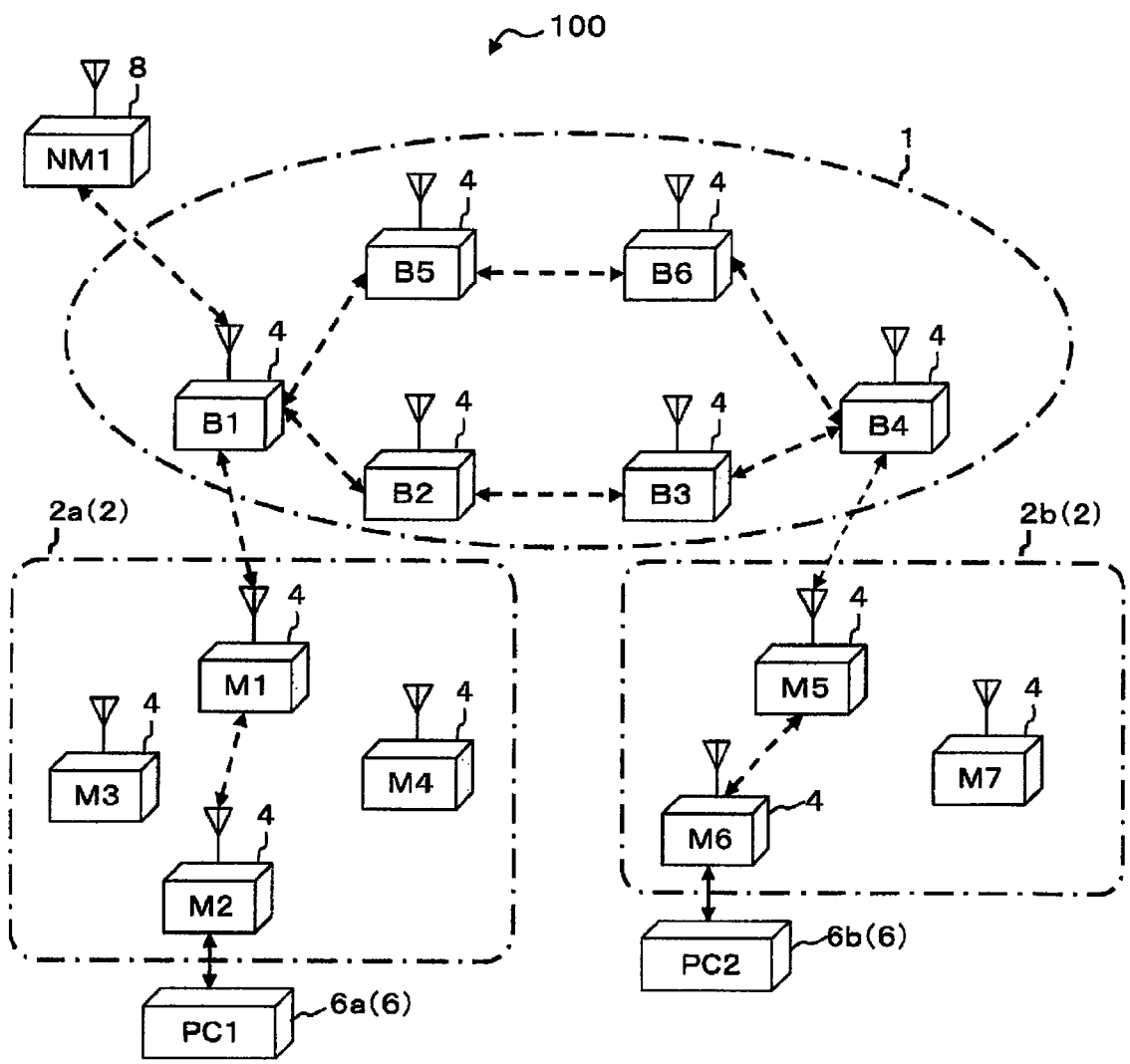
FIG. 1 It is a view showing an example of configuration of a communication system according to a first embodiment.

Next, a mode for carrying out the invention (hereinafter referred to as an "embodiment") will be described in detail, referring to the drawings when needed.

First Embodiment

<Configuration of Communication System>

As shown in FIG. 1, a multistage relay communication system 100 (hereinafter also referred to simply as a communication system) according to a first embodiment includes a trunk network 1 and branch networks 2 (2a, 2b). Also, each of the trunk network 1 and the branch networks 2 includes one or more communication apparatuses 4. A communication terminal 6a (PC1) and a communication terminal 6b (PC2) are a transmission source and transmission destination of data and are connected to the branch networks 2a, 2b, respectively. The communication apparatus 4 relays data based on a path table (communication channel information) storing an address of a communication counterpart which the communication apparatus itself sends and receives data to and from. Also, a management terminal 8 (NM1) is connected in a way that enables communication with the one or more communication apparatuses 4 arranged in the trunk network 1. The management terminal 8 gathers, maintains and manages path information in the communication system 100, generates path information to be set in a path table for each communication apparatus 4, and transmits the path information to the corresponding communication apparatus 4.

In the trunk network 1, when the communication system 100 is designed, the arrangement of the communication apparatus 4 is decided in such a way that the fixing of a communication path and the redundancy of data are possible in order to achieve real-timeness and a data arrival rate.

Meanwhile, the branch network 2 are set in an area that is considered to have a greater change in communication environment than in an area where the trunk network 1 is constructed, or in an area where installation of the communication apparatus 4 is decided after the trunk network 1 is constructed. For example, a change in communication environment is caused by expansion or rebuilding of a wall or structure or installation of fixtures or the like. Therefore, the branch networks 2 are designed to secure at least a data arrival rate even if real-timeness is impaired within an allowable range. Also, when a communication failure occurs, the communication apparatus 4 arranged in the branch networks 2 autonomously searches for a connectable path and flexibly constructs a communication path. In addition, the communication apparatus 4 operates based on an operation mode and is set to a trunk mode in the trunk network 1 and to a branch mode in the branch network 2. Also, the operation mode is changed based on an instruction from the management terminal 8.

In FIG. 1, an identification symbol (B1 to B6, M1 to M7) is given to each communication apparatus 4. Then, when a specific communication apparatus 4 is referred to, the communication apparatus is indicated by the identification symbol thereof. For example, the communication apparatus 4 having the identification symbol "B1" is described as communication apparatus B1. Also, the communication terminal 6a is expressed as communication terminal PC1 using the identification symbol "PC1". Similarly, the communication terminal 6b is expressed as communication terminal PC2 using the identification symbol "PC2". Also, the communication apparatus 4 has an interface for wireless communication and an interface for wired communication. The dotted lines with arrows show the connecting relation based on wireless communication. The solid lines with arrows show the connecting relation based on wired communication. In addition, the number of interfaces for wireless communication and for wired communication provided in the communication apparatus 4 is not limited to one each.

As a system used for wired communication, for example, Ethernet (trademark registered), which is a network conforming to the IEEE (The Institute of Electrical and Electronics Engineers, Inc.) 802.3 specifications, IEEE 1394, USB (Universal Serial Bus) (trademark registered), EIA (Electronic Industries Alliance)-232/442/485, CAN (Controller Area Network) and the like can be employed.

Meanwhile, as a system used for wireless communication, a wireless LAN (Local Area Network) conforming to the IEEE 802.11 specifications, a sensor network conforming to the IEEE 802.15.4 specifications, WiMAX (Worldwide Interoperability for Microwave Access) (trademark registered) conforming to the IEEE 802.16 specifications, low-power wireless, a system conforming to mobile phone packet network specifications and the like can be employed.

Here, in the first embodiment, a case where Ethernet is used for wired communication and a wireless LAN conforming to the IEEE 802.11 specifications is used for wireless communication is described.

As shown in FIG. 1, the communication apparatus B1 is an end point to enter the trunk network 1 from the branch network 2a. Similarly, the communication apparatus B4 is an end point to enter the trunk network 1 from the branch network 2b. Then, the communication apparatuses 4 arranged in the trunk network 1 transmit and receive data to and from each other, thus realizing communication which achieves real-timeness and a data arrival rate. Also, the communication apparatuses 4 (B1 to B6) decide a destination to which data should be transmitted, with reference to a path table.

The communication apparatus M2 in the branch network 2a is wired to the communication terminal PC1. Similarly, the communication apparatus M6 in the branch network 2b is wired to the communication terminal PC2. Here, the number of communication terminals 6 wired to the respective communication apparatuses M2, M6 is not limited to one each. For example, when Ethernet is employed for wired communication, plural communication terminals 6 can be connected to the respective communication apparatuses M2, M6 via a hub device. As for communication paths within the respective branch networks 2a, 2b, the communication apparatuses 4 (M1 to M7) autonomously search for paths using a proactive system or the like and generate and updates a path table.

The management terminal 8 stores at least path information of the communication apparatuses 4 installed in the trunk network 1, before the utilization of the communication system 100 is started. The path information is set in advance by a network constructor or the like. The management terminal 8 also stores path information to be set in the path table generated based on the above path information. Also, with respect to the branch networks 2, the management terminal 8 stores the communication apparatuses 4 (M1, M5) that are endpoints of the branch networks 2, and the communication terminals 6 that can be communicated with via the endpoints. Then, the management terminal 8 generates, for each communication apparatus 4, path information to be set in the path table which each communication apparatus 4 refers to when transferring data, and transmits the path information to the corresponding communication apparatus 4.

Also, when the communication system 100 is utilized, the management terminal 8 accepts a request for path information to be set in the path table from the communication apparatus 4 arranged in the trunk network 1, and transmits the path information corresponding to the communication apparatus 4. Also, when the management terminal 8 receives information of a communication failure from the communication apparatus 4 arranged in the trunk network 1, the management terminal 8, based on that information, generates path information to be set in the path table which reflects the communication path to be reconstructed and transmits the path information to the communication apparatus 4 appropriate for the reconstruction.

<Reconstruction of Communication System>

Next, a case where the communication system 100 is reconstructed because the wireless communication environment is changed will be described using FIG. 2. For example, a case where a shielding object emerges and causes a communication failure between the communication apparatus B4 and the communication apparatus M5 in the communication system 100 shown in FIG. 1 will be described. However, it is assumed that communication between the communication apparatus M5 and the communication apparatus B3 is possible.

First, the communication apparatus B4 determines that there is an occurrence of communication failure because a response (ACK) from the communication apparatus M5 does not arrive within a predetermined period of time in response to a transmission to the communication apparatus M5. Then, the communication apparatus B4 transmits to the management terminal 8 a notification that there is a communication failure with the communication apparatus M5. Next, the management terminal 8 performs control to switch the respective communication apparatus B3, B4 from the trunk network 1 to a branch network 2c (2), based on the stored path information. Specifically, the management terminal 8 executes rewriting of the path table and change of operation mode for the communication apparatuses 4 involved in the reconstruction.

Figure 2:
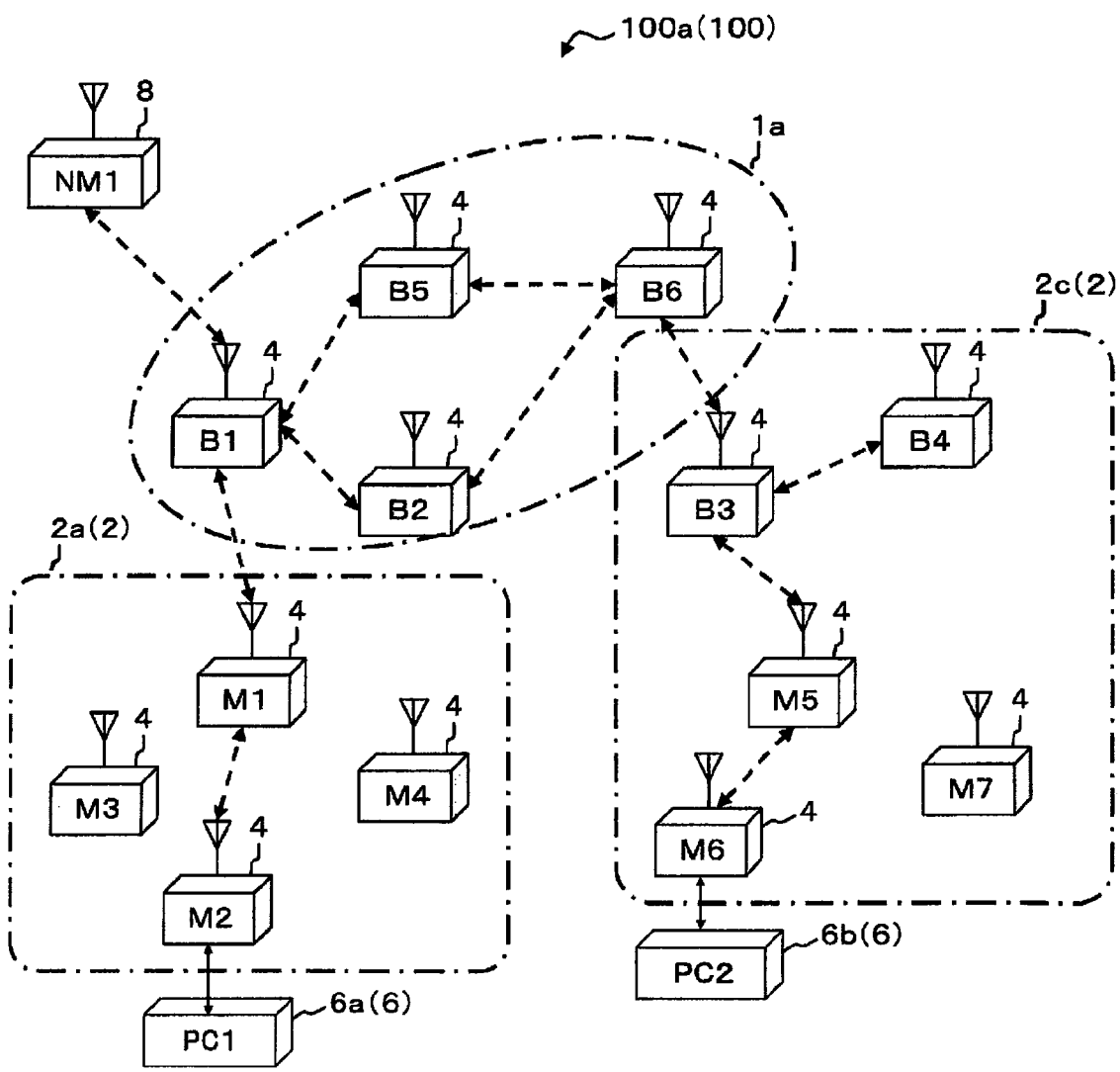
FIG. 2 It is a view showing an example of reconstruction of a communication system when a communication failure occurs in a path.

Consequently, a communication system 100a (100) shown in FIG. 2 is newly reconstructed. A new trunk network 1a is retracted from the original trunk network 1 (see FIG. 1) and the path table is updated in such a way that the end points of the trunk network 1a become the respective communication apparatuses B1, B6. Also, the operation mode is changed to the branch mode and the path table is updated so that the respective communication apparatuses B3, B4 operate as part of the branch network 2c. Then, the respective communication apparatuses B3, B4 come to operate as communication apparatuses 4 in the branch network 2c.

In transmission processing of data after the reconstruction, the end point of the trunk network 1a is changed to the communication apparatus B6 and the endpoint to transmit to the branch network 2c is changed to the communication apparatus B3, and thus the communication between the communication terminal PC1 and the communication terminal PC2 is continued.

By retracting the trunk network 1 and enlarging the branch network 2, as described above, communication channels in the communication system 100 can be changed flexibly. Therefore, the communication system 100 can continuously be used over a long period. Also, by transmitting the operation mode and the path information to be set in the path table from the management terminal 8, the operation of the communication apparatus 4 can be changed via remote control. Therefore, there is no need to immediately enter the site and carry out repair and recovery work of the communication apparatus 4 in order to cope with a communication failure.

By the way, when recovery from a communication failure is made by repair and recovery work, the original configuration of the communication system 100 shown in FIG. 1 can be restored by restoring the original path table and the operation mode stored in the management terminal 8.

<Configuration of Communication Apparatus>

Figure 3:
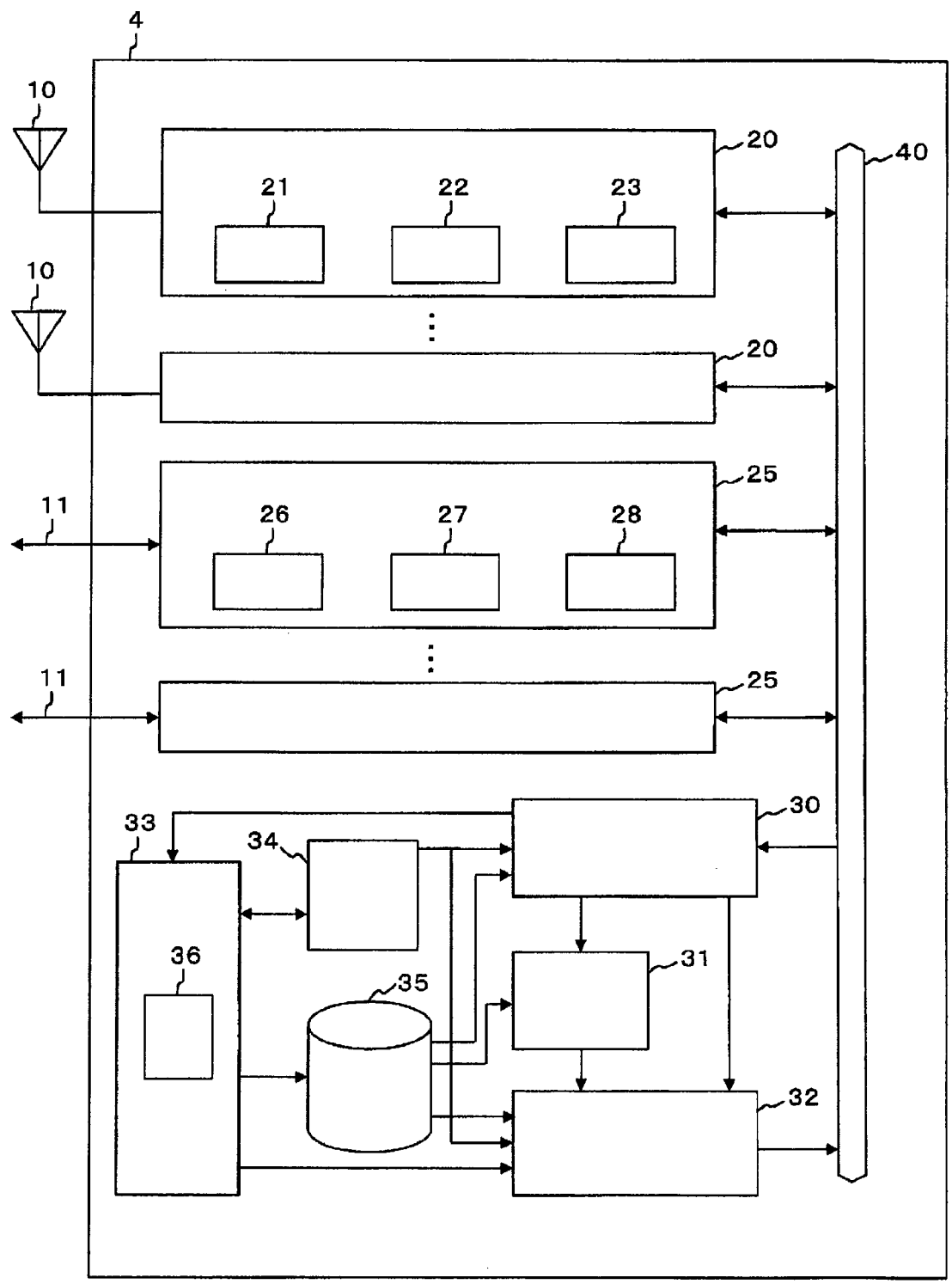
FIG. 3 It is a view showing an example of configuration of a communication apparatus.

Next, an example of configuration of the communication apparatus 4 will be described using FIG. 3.

The communication apparatus 4 has one or more wireless communication units 20 and wireless antennas 10, one or more wired communication units 25, a frame analyzing unit 30, a redundancy processing unit 31, a path control unit 32, a setting changing unit 33, apparatus mode information 34, a path table 35, and an internal transmission path 40. The reference numeral 11 indicates a wired transmission path. Also, the reason for having an antenna 10 in each wireless communication unit 20 is to enable plural communications simultaneously using different radio frequencies.

The wireless communication units 20, the wired communication units 25, the frame analyzing unit 30 and the path control unit 32 are connected to each other via the internal transmission path 40 and can transmit and receive information to each other.

Also, the wireless communication units 20, the wired communication units 25, the frame analyzing unit 30 and the path control unit 32 are embodied by executing a program in a one-chip microcomputer, not shown, or a CPU (Central Processing Unit) and a main storage unit, not shown. Also, the apparatus mode information 34 and the path table 35 are stored in a storage unit, not shown.

The wireless communication unit 20 has an amplifying unit 21, a modulating-demodulating unit 22, and a MAC (Media Access Control) unit 23 which perform media access control. The amplifying unit 21 converts radio waves received from the antenna 10 into an amplified electrical signal. The modulating-demodulating unit 22 demodulates the electrical signal received from the amplifying unit 21 and transmits the electrical signal to the MAC unit 23, and also modulates data received from the MAC unit 23 into an electrical signal. The MAC unit 23 properly arranges the format of data to be transmitted according to the wireless system, and executes transmission and reception processing, retransmission processing and error correction processing.

The wired communication unit 25 has an amplifying unit 26, a modulating-demodulating unit 27, and a MAC unit 28 which carries out media access control. The amplifying unit 26 converts a signal received from the wired transmission path into an amplified electrical signal. The modulating-demodulating unit 27 demodulates the electrical signal received from the amplifying unit 21 and transmits the electrical signal to the MAC unit 28, and also modulates data received from the MAC unit 28 into an electrical signal. The MAC unit 28 properly arranges the format of data to be transmitted according to the transmission system of the wired transmission path 11, and executes transmission and reception processing, retransmission processing and error correction processing.

As the internal transmission path 40, a serial communication such as PCI Express (trademark registered) or LVDS (Low Voltage Differential Signaling), and wired communication or wireless communication such as Ethernet or Ultra Wide Band can be used, as well as a parallel bus such as PCI (Peripheral Component Interconnect) bus or memory bus.

The frame analyzing unit 30 analyzes received data based on the apparatus mode information 34 and transmits the analyzed information to the redundancy processing unit 31, the path control unit 32 and the setting changing unit 33.

The setting changing unit 33 analyzes the information received from the frame analyzing unit 30 and changes the apparatus mode information 34 and the path table 35. The setting changing unit 33 also has a path constructing unit 36.

When the operation mode of the apparatus mode information 34 is the trunk mode, the path constructing unit 36 receives the path information to be set in the path table from the management terminal 8 and updates the path table 35. Meanwhile, when the operation mode of the apparatus mode information 34 is the branch mode, the path constructing unit 36 autonomously searches for a connectable path within the branch network 2 and updates the path table 35.

The redundancy processing unit 31 carries out redundancy of data to transmit received data in two or more communication paths with reference to the path table 35 and caries out unification of the redundant data received from the two or more communication paths. The unification refers leaving one of the same data that are received and disposing of the other. When carrying out redundancy of the data, the redundancy processing unit 31 also executes sequence number (sequence information) adding processing in order to identify the redundancy of data.

The path control unit 32, in order to transmit received data to the communication apparatus 4 as the next transfer destination, changes the address of the next transfer destination of the data with reference to the apparatus mode information 34 and the path table 35 and transmits the data via the wireless communication unit 20 or the wired communication unit 25.

The apparatus mode information 34 stores the operation mode information of the communication apparatus 4 and the apparatus's own address information. An example of the operation mode information is the trunk mode to operate in the trunk network 1 or the branch mode to operate in the branch network 2. In the trunk mode, redundancy of unification is executed at the communication apparatus 4 of the end point. Meanwhile, in the branch mode, reconstruction of the communication path is executed autonomously. An example of the address information is the MAC address that identifies the wireless communication unit 20 and the wired communication unit 25.

The path table 35 is information describing information to decide the transfer destination of data according to the final transmission destination of the data. A specific example of the path table 35 will be described later.

<Communication Frame>

Here, the format of a communication frame 50 used to transmit data from the communication terminal PC1 to the communication terminal PC2 in the communication system 100 shown in FIG. 1 will be described, using the format of a MAC frame used for wireless communication as an example and using FIG. 4.

The communication frame 50 includes plural fields in conformity to the IEEE 802.11 wireless communication system. The communication frame 50 includes a MAC header 66, a Mesh header 67, a payload 64, and an FCS (frame check sequence) 65. Each of the MAC header 66 and the Mesh header 67 includes plural fields. These fields include necessary fields depending on the application of the communication frame 50, instead of constantly including all fields. Also, the communication frame 50 is transmitted to a communication path from the side of a field indicated by a reference numeral 51 in FIG. 4, unless otherwise specified.

The MAC header 66 includes fields of frame control 51, duration/ID 52, ADR1 (RA) 53 (address 1), ADR2 (TA) 54 (address 2), ADR3 (MDA) 55 (address 3), sequence control 56, ADR4 (MSA) 57 (address 4), and QoS control 58.

The Mesh header 67 includes fields of mesh flag 59, mesh end point sequence number 60, TTL (Time To Live) 61, ADR5 (DA) 62 (address 5), and ADR6 (SA) 63 (address 6).

The ADR1 (RA) 53 is a receiver address (RA) and indicates the address of the next communication apparatus 4 to receive the communication frame 50.

The ADR2 (TA) 54 is a transmitter address (TA) and indicates the own address of the communication apparatus 4 which transmits the communication frame 50.

The ADR3 (MDA) 55 is a mesh end point destination address (mesh destination address: MDA) and indicates the address of the communication apparatus 4 to be the exit of the trunk network 1 or the exit of the branch network 2.

The ADR4 (MSA) 57 is a mesh end point source address (mesh source address: MSA) and indicates the address of the communication apparatus 4 to be the entrance of the trunk network 1 or the entrance of the branch network 2.

The ADR5 (DA) 62 is a destination address (DA) and indicates the address of the communication terminal 6 to be the final destination of the communication frame 50.

The ADR6 (SA) 63 is a source address (SA) and indicates the address of the communication terminal 6 which transmits the communication frame 50 first.

<Transition of Address Fields of Communication Frame>

Next, transition of the address fields ADR1 to ADR6 of the communication frame 50 updated every time data goes via of the communication apparatus 4 when data transmitted from the communication terminal PC1 to the communication terminal PC2 is transmitted through a path of PC1→M2→M1→B1→[B2 and B5]→[B3 and B6]→B4 M5→M6→PC2, as shown in FIG. 1, will be described using FIG. 5.

FIG. 5(*a*) shows the address fields of the communication frame 50 in the branch network 2*a* on the transmitting side. (*b*) and (*c*) show the address fields of the communication frame 50 in the trunk network 1. (*d*) shows the address fields of the communication frame 50 in the branch network 2*b* on the receiving side. In FIG. 5, the transmitting side of the communication frame 50 is shown as a transmitting device 70 and the receiving side of the communication frame 50 is shown as a receiving device 71. The address fields are the ADR1 to ADR6 shown in FIG. 4. Here, the reference numerals 80 to 91 indicate rows. Also, the row 80 and the row 91 represent transmission via Ethernet. That is, the ADR5 (DA) 62 and ADR6 (SA) 63 shown in the row 80 and the row 91 mean the destination address (DA) and the source address (SA) included in the MAC header of Ethernet. Also, "N/A" stands for "Not Applicable", which means no reference to values. N/P stands for "Not Presented", which means that there is no corresponding field.

FIG. 5(a) shows changes in the address of the communication frame 50 which moves from the communication terminal PC1 to the communication apparatus B1.

The row 80 shows addresses when the communication frame 50 is sent out from the communication terminal PC1 toward the communication terminal PC2. Here, the communication terminal PC1 is assumed to grasp the address of the communication terminal PC2 in advance according to the ARP (Address Resolution Protocol). The row 80 shows address in the Ethernet-conforming format, as described above. Therefore, only the fields of ADR5 (DA) 62 and ADR6 (SA) 63 exist. "PC2" is stored in the ADR5 (DA) 62 and "PC1" is stored in the ADR6 (SA) 63.

The row 81 shows addresses when the communication frame 50 is transmitted from the communication apparatus M2 to the communication apparatus M1. Here, the address of the next receiving communication apparatus M1 is stored in the ADR1 (RA) 53 and the address of the transmitting communication apparatus M2 is stored in the ADR2 (TA) 54. Also, the address of the communication apparatus M1, which is the exit of the branch network 2a, is stored in the ADR3 (MDA) 55, and the address of the communication apparatus M2, which is the entrance of the branch network 2a, is stored in the ADR4 (MSA) 57.

The row 82 shows addresses when the communication frame 50 is transmitted from the communication apparatus M1 to the communication apparatus B1. Since the communication apparatus M1 is the exit of the branch network 2a, N/A is entered in the fields of ADR3 (MDA) 55 and ADR4 (MSA) 57.

Next, FIGS. 5(b) and (c) show address fields in the case where redundancy of the communication frame 50 is carried out in the trunk network 1. Here, the communication apparatus B1, which is the entrance of the trunk network 1, carries out redundancy of the communication frame 50 when the communication frame 50 is received from the communication apparatus M1.

The row 83 in FIG. 5 (b) shows addresses when the redundant communication frame 50 is transmitted from the communication apparatus B1 to the communication apparatus B2. Then, in the row 84, the redundant communication frame 50 is transmitted from the communication apparatus B2 to the communication apparatus B3. In the row 85, the redundant communication frame 50 is transmitted from the communication apparatus B3 to the communication apparatus B4.

Similarly, the row 86 in FIG. 5(c) shows addresses when the redundant communication frame 50 is transmitted from the communication apparatus B1 to the communication apparatus B5. In the row 87, the redundant communication frame 50 is transmitted from the communication apparatus B5 to the communication apparatus B6. In the row 88, the redundant communication frame 50 is transmitted from the communication apparatus B6 to the communication apparatus B4.

Next, FIG. 5(d) shows address fields after unification of the communication frame 50 is carried out at the communication apparatus B4, which is the exit of the trunk network 1.

The row 89 in FIG. 5(d) shows addresses when the unified communication frame 50 is transmitted from the communication apparatus B4 to the communication apparatus M5. At this point, since the network is switched from the trunk network 1 to the branch network 2b, N/A is entered in the ADR3 (MDA) 55 and ADR4 (MSA) 57. Then, in the row 90, the communication frame 50 is transmitted from the communication apparatus M5 to the communication apparatus M6. Next, in the row 91, the communication apparatus M6 transmits the communication frame to the communication terminal PC2 via the wired communication path 11.

<Path Table>

Next, an example of the path table 35 of the communication apparatus 4 will be described using FIG. 6. Here, FIG. 6 shows a path table 35a of the communication apparatus B1, which is the entrance of the trunk network 1 shown in FIG. 1.

The path table 35a includes columns of DA (destination address) 200, MDA (mesh end point destination address) 201, RA (receiver address) 202, end point flag 203, and I/F (interface) 204 for transmitting and receiving the communication frame 50. Here, the I/F 204 refers to one of the wireless communication units 20 and the wired communication units 50 shown in FIG. 3. Also, rows 210 to 215 include plural tuple data.

The row 210 shows that the communication frame 50 to be transmitted to the communication terminal PC2 is transmitted via the communication apparatus B4, which is the exit of the trunk network 1.

The row 211 shows that the communication frame 50 to be transmitted to the communication terminal PC1 is transmitted via the communication apparatus M1, which is the entrance of the branch network 2a. Also, the I/F 204 shows that wlan0 is used.

The row 212 shows that the communication apparatus B4 is an end point of the trunk network 1 because the end point, flag 203 is "Yes". It is also shown that the communication frame 50 to be transmitted to the communication apparatus B4 is transmitted via the communication apparatus B2. Moreover, the I/F 204 shows that wlan1 is used.

The row 213 shows that the communication apparatus B4 is an end point of the trunk network 1 because the end point flag 203 is "Yes". It is also shown that the communication frame 50 to be transmitted to the communication apparatus B4 is transmitted via the communication apparatus B5. Moreover, the I/F 204 shows that wlan2 is used.

The row 214 shows that the communication frame 50 to be transmitted to the communication apparatus B3 is transmitted via the communication apparatus B2. Also, the I/F 204 shows that wlan1 is used.

The row 215 shows that the communication frame 50 to be transmitted to the communication apparatus B6 is transmitted via the communication apparatus B5. Also, the I/F 204 shows that wlan2 is used.

That is, the communication apparatus B1 extracts the address "PC2" of the final destination ADR5 (DA) (62) stored in the address field of the communication frame 50 received from the branch network 2a. Then, referring to the row 210 in the path table 35a, the communication apparatus B1 extracts that the value of the MDA 201 is "B4" when the DA 200 is "PC2". Next, referring to the row 212 and row 213, the communication apparatus B1 recognizes that there are two receiver addresses 202 with the destination "B4", and determines that the communication apparatus B1 itself carries out redundancy of the communication frame 50. Then, the communication apparatus B1 duplicates the communication frame 50 and transmits the communication frame 50 to the communication apparatus B2 and the communication apparatus B5.

<Operation Flow of Communication Apparatus>

Next, the operation flow of the communication apparatus 4 will be described using FIG. 7 (see FIG. 3 when needed).

First, the wireless communication unit 20 or the wired communication unit 25 of the communication apparatus 4 receives the communication frame 50 (step S101). Then, the received communication frame 50 is transmitted to the frame analyzing unit 30 via the internal transmission path 40.

The frame analyzing unit 30 acquires the apparatus's own operation mode information and address with reference to the apparatus mode information 34. The frame analyzing unit 30 compares the final destination of the received communication frame 50 with the apparatus's own address and determines whether the communication frame 50 is addressed to the apparatus itself or not (step S102).

If it is determined in step S102 that the communication frame 50 is addressed to the apparatus itself (Yes in step S102), the frame analyzing unit 30 further determines whether the information stored in the communication frame 50 is a setting change related to the setting changing unit 33 or not (step S113). If the information is determined as a setting change (Yes in step S113), the frame analyzing unit 30 notifies the setting changing unit 33 of the information ("notification of setting change" in step S114). If the information is determined as not a setting change (No in step S113), a notification is sent to a maintenance unit, not shown ("notification of maintenance" in step S115), and the communication processing ends. The notification of setting change carried out in step S114 is, for example, to designate a change in one or both of the path table 35 and the apparatus mode information 34 (particularly the operation mode information). The content of the information reported by the notification of setting change is the information stored in the payload 64. The notification of maintenance in step S115 is, for example, to instruct the maintenance unit, not shown, to transmit maintenance information such as the current operation information and maintenance history to the management terminal 8 in order to monitor and maintain the operating state of the communication apparatus 4.

If it is determined in step S102 that the communication frame 50 is not addressed to the apparatus itself (No in step S102), the frame analyzing unit 30 determines whether the apparatus itself is an end point of the network or not, with reference to the path table 35 (step S103).

If the apparatus itself is determined as an end point of the network (Yes in step S103), the frame analyzing unit 30 determines whether the apparatus itself is the entrance of the network or not, with reference to the path table 35 (step S104).

If the apparatus itself is determined as the entrance of the network (Yes in step S104), the frame analyzing unit 30 instructs the redundancy processing unit 31 to carry out redundancy of the communication frame 50 (transmit a notification of execution) and the redundancy processing unit executes redundancy processing (step S105). If the apparatus itself is determined as not the entrance of the network (that is, as the exit) (No in step S104), the frame analyzing unit 30 instructs the redundancy processing unit 31 to carry out unification and the redundancy processing unit 31 executes unification processing (step S106).

If the apparatus itself is determined as not an end point of the network in step S103 (No in step S103), that is, if the communication apparatus 4 in the middle of the communication path, the path control unit 32 updates the receiver address RA 53 and the transmitter address TA 54 and the like of the communication frame 50 received from the frame analyzing unit 30, with reference to the path table 35 (step S107).

Then, after the processing of steps S105, S106 and S107, the path control unit 32 selects one (communication interface) of the wireless communication units 20 and the wired communication units 25 to be used to transmit the communication frame 50 to the destination, with reference to the path table 35, and transmits the communication frame 50 to the communication interface via the internal transmission path 40. The communication interface, receiving the communication frame 50, transmits the communication frame 50 to the transmission path (step S108).

After the communication frame 50 is transmitted, the frame analyzing unit 30 determines whether response information (ACK) is received from the transmission destination of the communication frame 50 or not (whether the transmission is successful or not) (step S109). If the transmission is determined as successful (Yes in step S109), the frame analyzing unit 30 ends the communication processing.

If the transmission is determined as failed (No in step S109), the frame analyzing unit 30 determines whether the apparatus itself is in the branch mode or not, with reference to the apparatus mode information 34 (step S110). If it is determined that the apparatus itself is not in the branch mode (the apparatus is in the trunk mode) (No in step S110), the frame analyzing unit 30 ends the communication processing. That is, the communication apparatuses 4 (B1 to B6) arranged in the trunk network 1 emphasize real-timeness and therefore eliminate as much retransmission processing as possible which causes variance in communication delay time. However, in the trunk network 1, since redundancy of the communication path is carried out, even when the communication frame 50 cannot be transmitted through one communication path, the communication frame 50 can be transmitted through the other communication path.

If it is determined in step S110 that the apparatus is in the branch mode (Yes in step S110), the frame analyzing unit 30 confirms whether a retransmission condition is met or not (step S111). The retransmission condition is, for example, one or a combination of TTL or less, the number of times of retransmission or less, and within a predetermined time period. If it is determined that the retransmission condition is met (Yes in step S111), the processing returns to step S108 and the path control unit 32 retransmits the communication frame 50.

If it is determined that the retransmission condition is not met (No in step S111), the path constructing unit 36 autonomously reconstructs the communication path in the branch network 2 (step S112). After the communication path is reconstructed, the processing returns to step S108 and the path control unit 32 retransmits the communication frame 50.

As described above, when the operation mode of the communication apparatus 4 is the trunk mode, redundancy of the communication path is carried out with the path table 35 in order to maintain real-timeness and the data arrival rate. Meanwhile, when the operation mode of the communication apparatus 4 is the branch mode, even if a failure occurs in the communication path, reconstruction of the communication path is executed and the data arrival rate can thus be maintained. Also, since the operation mode of the communication apparatus 4 can be switched between the trunk mode and the branch mode according to an instruction from the management terminal 8, for example, change from the communication system 100 shown in FIG. 1 to the communication system 100a shown in FIG. 2 can easily be realized.

<Operation Flow of Redundancy Processing Unit>

Figure 8:
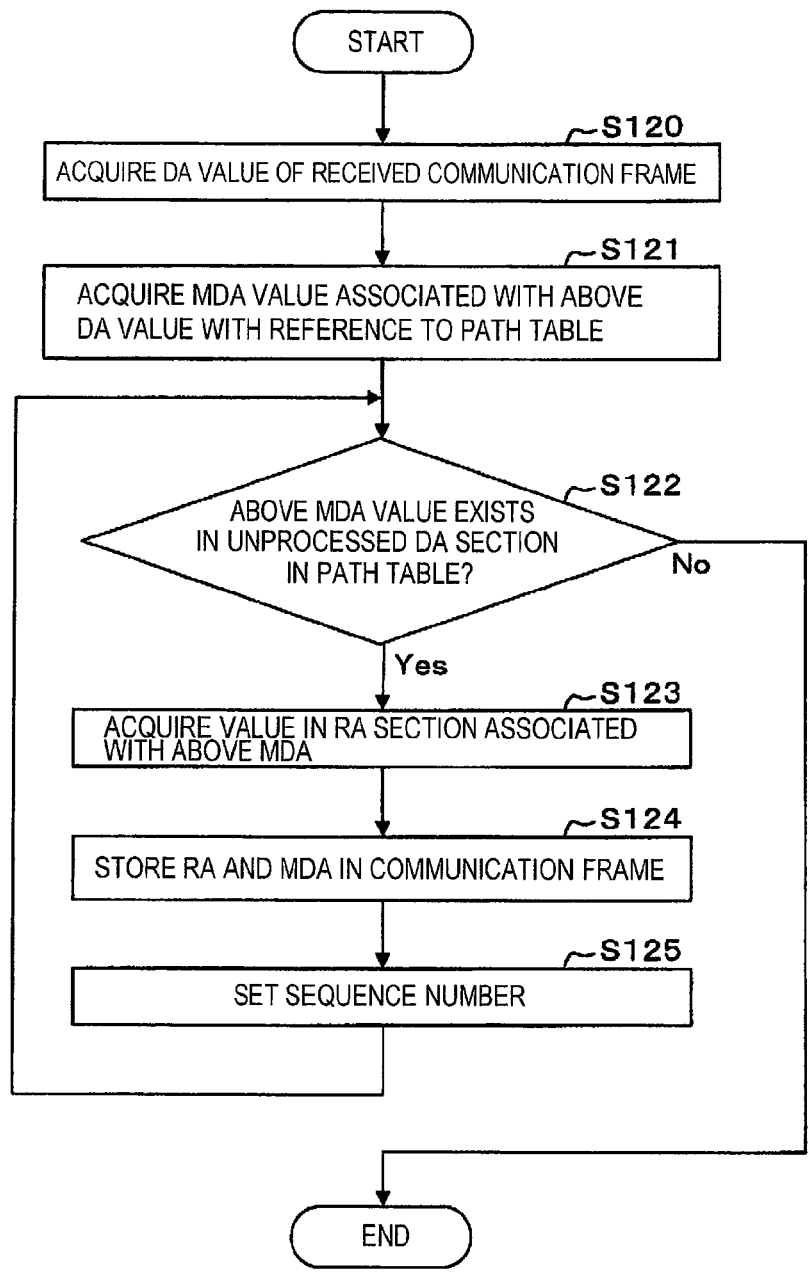
FIG. 8 It is a view showing an example of an operation flow of a redundancy processing unit.

Next, the operation flow of the redundancy processing unit 31 will be described using FIG. 8 (see FIG. 6 when needed)

Here, a case where the redundancy processing unit 31 of the communication apparatus B1 executes redundancy processing using the path table 35a of FIG. 6 will be described an example. The path table 35a of FIG. 6 is used in the case where the communication frame 50 is transmitted from the communication terminal PC1 to the communication terminal PC2.

The redundancy processing unit 31 acquires the value of the destination address DA of the communication frame 50 extracted by the frame analyzing unit 30 (step S120) and recognizes that the communication frame is addressed to "PC2". Next, the redundancy processing unit 31 searches the mesh end point destination address MDA section corresponding to the case where the value in the DA section is "PC2", with reference to the path table 35a, and acquires "B4" stored in the MDA section associated with "PC2" (step S121).

Next, in the processing to sequentially search the rows in the path table 35a and check the destination address DA section where "B4" is stored, the redundancy processing unit determines whether the MDA value "B4" exists in an unprocessed DA section or not (step S122). If the MDA value does not exist in an unprocessed DA section (No in step S122), the redundancy processing ends.

If the MDA value exists in an unprocessed DA section in step S122 (Yes in step S122), the redundancy processing unit 31 acquires the value in the RA section associated with the MDA (step S123).

Then, the redundancy processing unit 31 stores the RA value and the MDA value in the ADR1 (RA) 53 and the ADR3 (MDA) 55 of the communication frame 50, respectively (step S124). Next, the redundancy processing unit 31 stores a sequence number which identifies that redundancy of the communication frame 50 is carried out, in the mesh end point sequence number 60 shown in FIG. 4 (step S125), and transmits the sequence number to the path control unit 35. Here, in FIG. 8, the processing following step S125 is described as returning to step S122. However, this refers to processing to repeat searching the rows.

Figure 7:
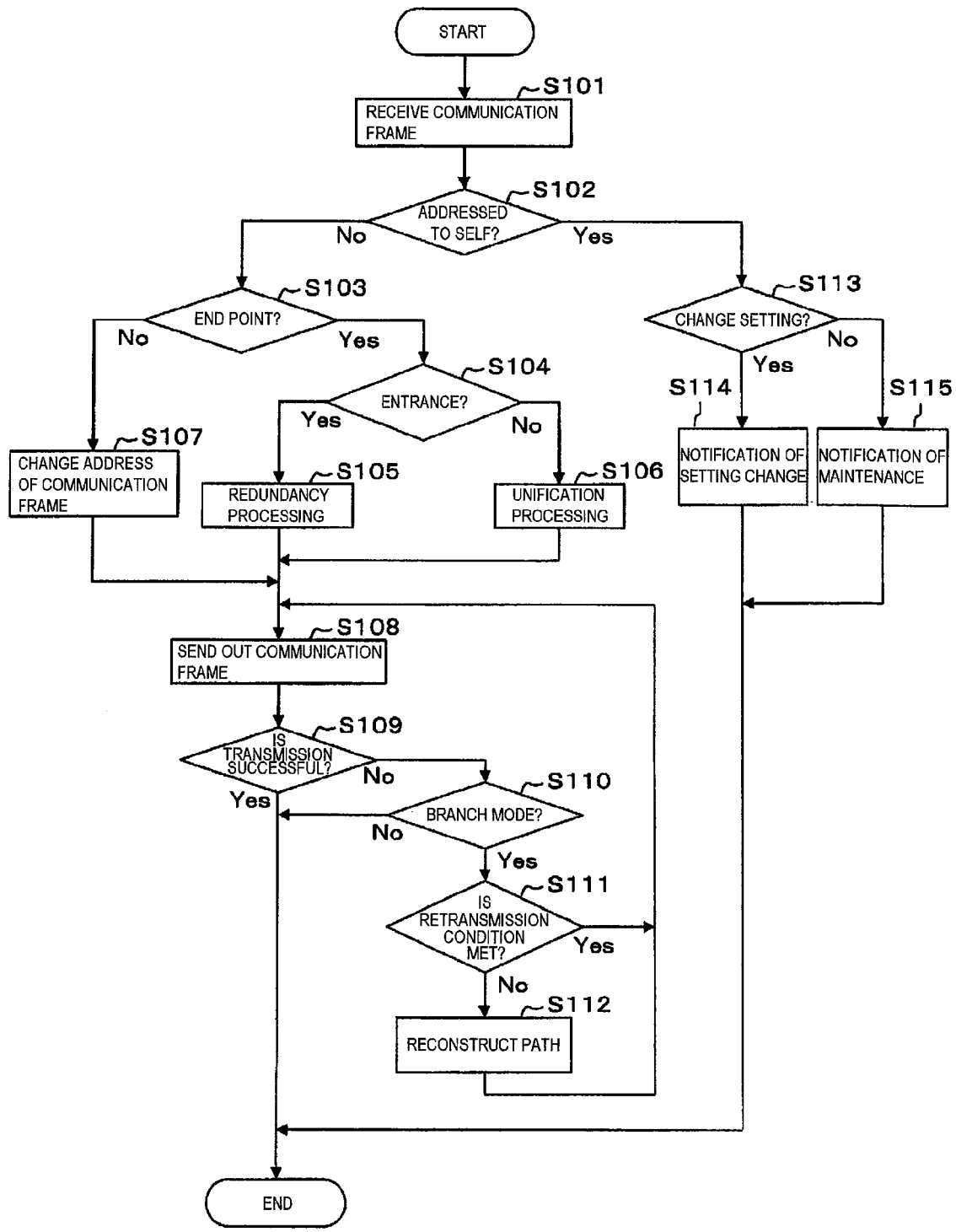
FIG. 7 It is a view showing an operation flow of a communication apparatus.

Meanwhile, when carrying out the unification processing shown in step S106 of FIG. 7, the redundancy processing unit 31 determines that the communication frame 50 is made redundant based on the mesh endpoint sequence number 60 and carries out the unification. Specifically, the redundancy processing unit 31 unifies the data of the redundant communication frame 50, using a predetermined algorithm. Here, the predetermined algorithm is, for example, a method that employs regular data of the previously arriving communication frame 50, or a method that selects from the redundant communication frame 50 by a majority decision, and the like.

<Update of Apparatus Mode Information and Path Table>

Next, an example of instruction information which the setting changing unit 33 is notified of from the management terminal 8 in order to update the apparatus mode information 34 and the path table 35 will be described using FIG. 9.

Figure 4:
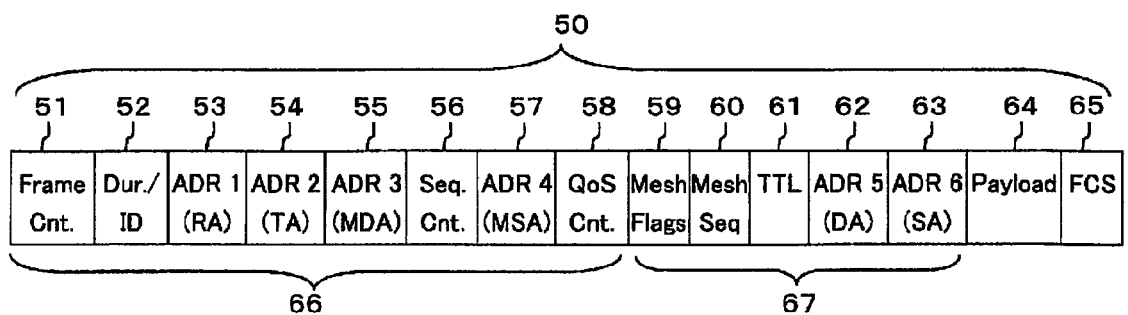
FIG. 4 It is a view showing an example of format of a communication frame.
Figure 9:
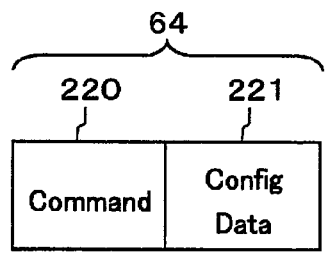
FIG. 9 It is a view showing an example of instruction information that is reported to a setting changing unit.

The information which the setting changing unit 33 is notified of (see step S114 of FIG. 7) is stored in the form of a command 220 and configuration control data 221, as shown in FIG. 9, in the payload 64 of the communication frame 50 (see FIG. 4).

The command 220 stores a subject of setting change and an operation executed on the subject. The subject of setting change is the apparatus mode information 34 and the path table 35. Also, the operation executed on the subject of setting change is erasure, change, addition, read-out and the like.

The configuration control data 221 represents information that is set with respect to the subject of setting change. For example, with respect to the apparatus mode information 34, information that expresses the "trunk mode" indicating that the apparatus operates as the trunk network 1 or the "branch mode" indicating that the apparatus operates as the branch network 2 is stored. Meanwhile, with respect to the path table 35, information of the communication path is stored.

The frame analyzing unit 30 receives the communication frame 50 storing the notification to the setting changing unit 33 and notifies the setting changing unit 33 of the content of the payload 64 of this communication frame 50. The setting changing unit 33 interprets the content of the payload 64 and executes an operation on the subject of setting change.

Therefore, the management terminal 8 can change the apparatus mode information 34 and the path table 35 by remote control via the setting changing unit 33. That is, the apparatus mode information 34 (particularly, the operation mode information) of the communication apparatus 4 and the path table 35 can be changed after the utilization.

As described above, the communication system 100 according to the first embodiment (see FIG. 1) can flexibly cope with communication failures by properly changing, by remote control, the operation mode (trunk mode or branch mode) that is set at the time of introduction. Therefore, availability of the communication system 100 can be maintained.

<Operation Flow of Path Constructing Unit>

Figure 10:
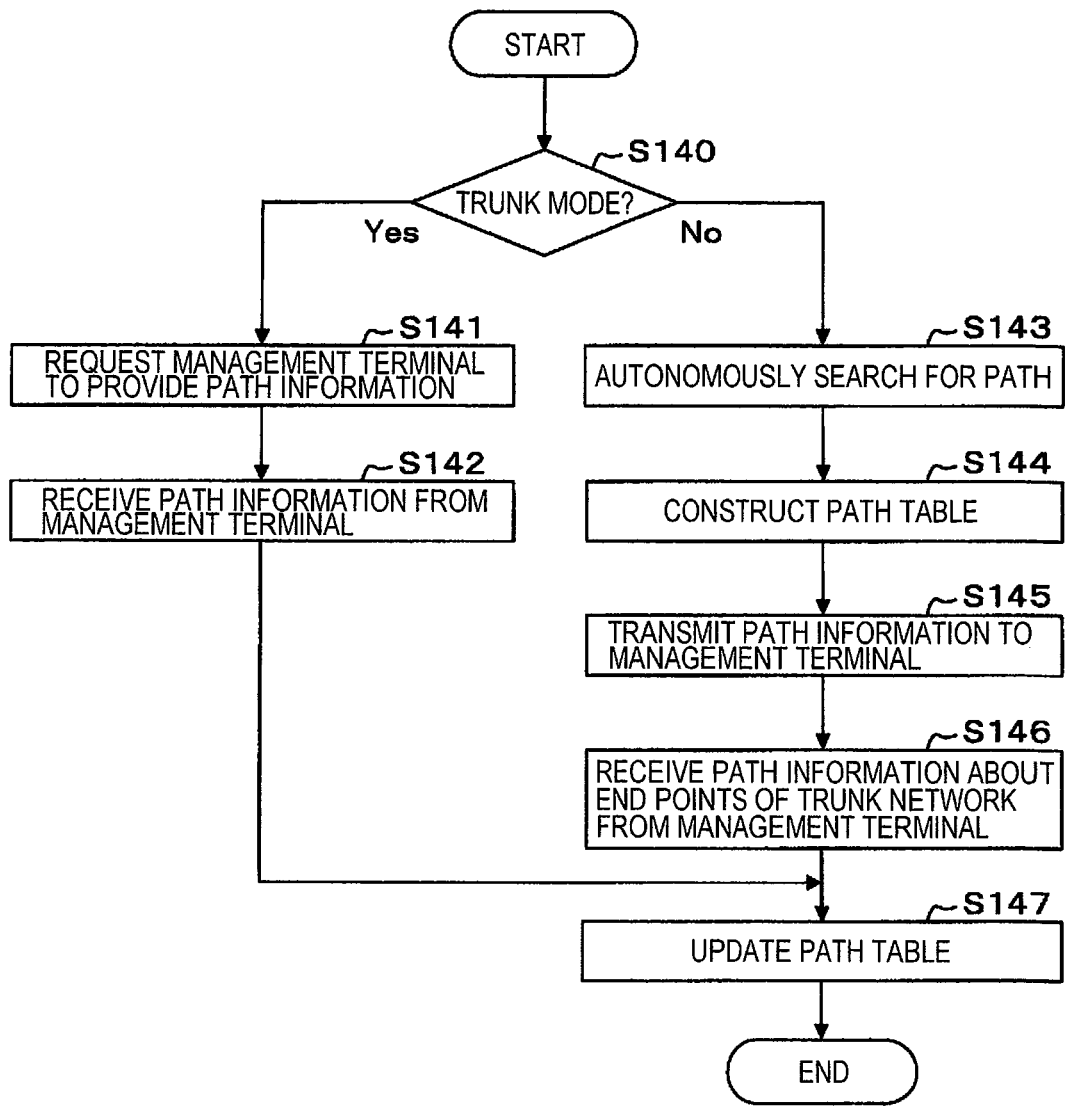
FIG. 10 It is a view showing an operation flow of a path constructing unit when a communication path is initialized and when the communication path is reconstructed.

Next, the operation flow of the path constructing unit 36 at the time of initializing a communication path and at the time of reconstruction will be described using FIG. 10.

The path constructing unit 36 executes processing to update the path table 35 at the time of initializing the communication apparatus 4 and at the time of reconstruction. The time of initialization is when the communication apparatuses 4 are arranged as shown in FIG. 4 and the power of each communication apparatus 4 is turned on. Also, the time of reconstruction is when a communication failure occurs in one of the paths as shown in FIG. 2 and the communication path is changed.

First, the path constructing unit 36 determines whether the operation mode of the apparatus itself is the trunk mode or not, based on the apparatus mode information 34 (step S140). Here, if the operation mode is not the trunk mode, it means that operation mode is the branch mode.

If it is determined in step S140 that the apparatus itself is in the trunk mode (Yes in step S140), the path constructing unit 36 requests the management terminal 8 to provide path information to be set in the path table 35 (step S141). Specifically, the path constructing unit 36 stores a path request command in the command 220 (see FIG. 9) and instructs the path control unit 32 to send the communication frame 50 addressed to the management terminal 8. The path control unit 32 transmits the communication frame 50 which is addressed to the management terminal 8 and in which the path request command is stored, to the communication apparatus 4 authorized for connection in advance. Then, the path constructing unit 36 receives path information to be set in the path table 35 from the management terminal 8, in the form of the configuration control data 221 together with the command 220 (see FIG. 9) (step S142). Next, the path constructing unit 36 updates the stored path table 35 with the received path information to be set in the path table 35 (step S147). The processing then ends.

If it is determined in step S140 that the operation mode of the apparatus itself is not the trunk mode (the operation mode is the branch mode) (No in step S140), the path constructing unit 36 autonomously searches for a connectable path in the branch network 2 (step S143). As an algorithm to autonomously search for a path, a path control protocol for ad hoc network can be employed. For example, in a proactive system, there is an OLSR (Optimized Link State Routing) protocol. Also, in a reactive system, there is an AODV (Ad-hoc On-demand Distance Vector) protocol. Moreover, as an example in which the two protocols are combined, there is an HWMP (Hybrid Wireless Mesh Protocol), the standardization of which is in progress under IEEE 802.11s. In this way, the communication apparatus 4 in the branch mode flexibly copes with a change in the wireless environment and changes the communication path in order to secure a data arrival rate.

The path constructing unit 36 constructs the path table 35 based on the result of the step S143 (step S144). Next, if there is a change in end points of the branch network 2, the path constructing unit 36 transmits information of a path that goes via the changed end point, to the management terminal 8 (step S145). Specifically, the path constructing unit 36 stores a path change command to change the path in the command 220 (see FIG. 9) and instructs the path control unit 32 to send the communication frame 50 addressed to the management terminal 8. The path control unit 32 transmits the communication frame 50 which is addressed to the management terminal 8 and in which the path request command is stored, to the communication apparatus 4 authorized for connection in advance.

Then, the path constructing unit 36 receives path information about end points of the trunk network 1 from the management terminal 8 (step S146). Next, the path constructing unit 36 updates the stored path table 35 with the received path information (step S147). The processing then ends.

Thus, in the first embodiment, the communication apparatuses 4 arranged in the trunk network 1 shown in FIG. 1 operate in the trunk mode in which redundancy of the communication path is carried out for communication in order to maintain real-timeness and a high data arrival rate. Meanwhile, the communication apparatuses 4 arranged in the branch network 2 operates in the branch mode in which the communication path can flexibly be changed according to a communication failure in order to maintain a high data arrival rate. Therefore, according to the first embodiment, a communication apparatus and communication system in which real-timeness and a high data arrival rate are maintained can be provided.

Second Embodiment

Figure 11:
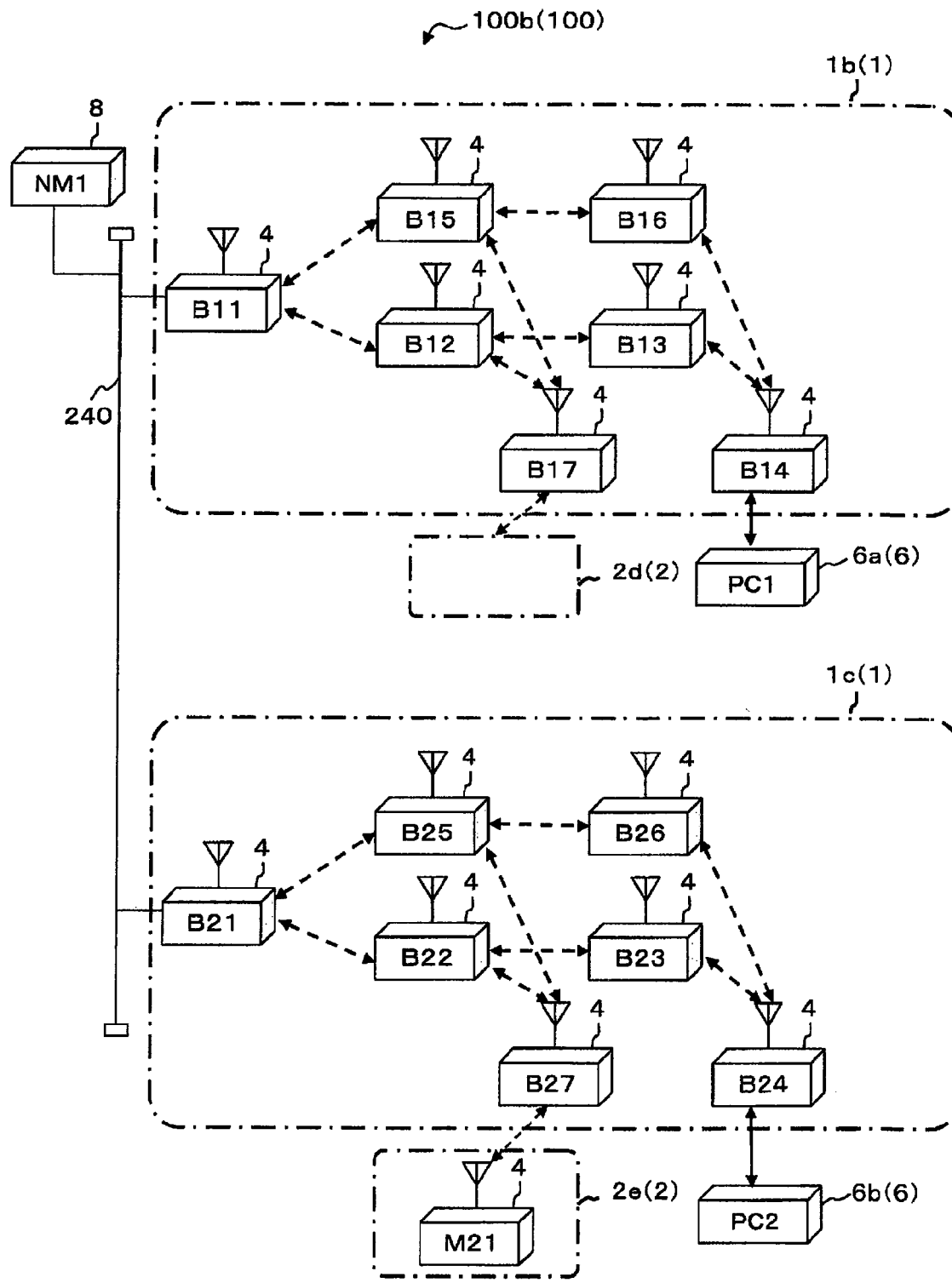
FIG. 11 It is a view showing an example of configuration of a communication system according to a second embodiment.

As shown in FIG. 11, in a multistage relay communication system 100b (100) (hereinafter referred to simply as a communication system) described in a second embodiment, two trunk networks 1 (1b, 1c) are connected by a wired communication channel 240. For example, in order to use a wireless communication channel for a network that penetrates the top to bottom floors as a network infrastructure within a building, radio waves must be transmitted through ceilings and floors and therefore there is a problem with stability of communication. Thus, by employing the wired communication channel 240 as a network that penetrates the top to bottom floors and constructing the respective trunk networks 1b, 1c within floors, the multistage relay communication system 100b shows in FIG. 11 can maintain real-timeness and a data arrival rate. As for the wired communication channel 240, for example, a case of using Ethernet is described. Here, the number of trunk networks 1 connected to the wired communication channel 240 is not limited to two and may be three or more. Also, reference numerals in FIG. 11 which are the same as reference numerals in FIG. 1 denote the same elements and therefore the description thereof is left out.

The configuration in which each of the respective trunk networks 1b, 1c shown in FIG. 11 includes one or more communication apparatuses 4 is the same as in the case of the trunk network 1 shown in FIG. 1. Also, the communication apparatuses 4 arranged in the respective trunk networks 1b, 1c operate in the trunk mode.

Although the respective branch networks 2d, 2e are simplified and indicated by chain-dotted lines in FIG. 11, the branch networks 2d, 2e, 1c may be provided according to need and may or may not include one or more communication apparatuses 4.

Also, the communication section of the wired communication channel 240 in the second embodiment is not limited to wired communication. For example, the communication section may be connected via another trunk network 1 or another branch network 2.

Next, an example of a path table 35b according to the second embodiment will be described using FIG. 12. FIG. 12 is an example of the path table 35b of a communication apparatus B21 connected to the wired communication channel 240. Even in the communication between the trunk network 1b and the trunk network is via the wired communication channel 240, a communication path can be established by referring to the path table 35b.

The elements in the columns of the path table 35b are similar to FIG. 6 and therefore the description thereof is left out. Also, rows 260 to 268 are formed in conformity to FIG. 11.

For example, it can be understood that, in order to transmit the communication frame 50 from the communication apparatus B21 to the communication terminal PC2, transmission can be done by setting "324" as the mesh end point destination address MDA with reference to the row 260. Moreover, it can be understood that, in order to send data addressed to the communication apparatus B24, transmission can be done by setting "B22" and "B25" as the receiver address RA and via the I/F 204 of wlan1, wlan2 (wireless LAN interfaces Nos. 1 and 2), respectively, with reference to the row 262 and the row 263.

Also, it can be understood that, in order to transmit the communication frame 50 from the communication apparatus B21 to the communication terminal PC1, transmission can be done by setting "B11" as the receiver address RA via eth0 (meaning Ethernet interface No. 0) as the I/F 204 with reference to the row 261.

As described above, the respective trunk networks 1b, 1c can be linked to each other.

Third Embodiment

A third embodiment is a case where redundancy is carried out within the branch network 2, compared with the first embodiment. The arrangement of the communication apparatuses 4 in the branch network 2 described as an example here is similar to FIG. 1 and therefore not shown. However, in the first embodiment, the communication apparatus M1 and the communication apparatus M2 directly communicate with each other in the branch network 2 of FIG. 1. Meanwhile, in the third embodiment, redundancy is carried out as a measure to prevent communication from being blocked by a shielding object or the like between the communication apparatus M1 and the communication apparatus M2. In view of improvement in availability of the communication system 100, it is desirable that the communication frame 50 can be transmitted using two or more communication paths in the branch network 2, too.

Thus, the third embodiment describes that a communication path for communication between the communication apparatus M1 and the communication apparatus M2 via the communication apparatus M3 or the communication apparatus M4 is defined in the path table 35, thus a redundant communication path to be set.

FIG. 13 shows an example of a path table 35c in the communication apparatus M1 within the branch network 2a shown in FIG. 1.

It can be understood that, in order to transmit the communication frame 50 from the communication apparatus M1 to the communication terminal PC1, transmission can be done by setting "M2" as the mesh end point address MDA with reference to a row 280. Next, it can be understood that, in order to transmit the communication frame 50 to the communication apparatus M2, transmission can be done via the communication apparatus M3 and the communication apparatus M4, which are the two redundant paths, with reference to a row 282 and a row 283. Moreover, in the row 282 and the row 283, "Yes" is shown as the end point flag 203, and it can be understood that the communication apparatus M2 is the end point.

Therefore, by using the path table 35c shown in FIG. 13 and sequentially executing the processing of steps S103, S104 and S105 in the operation flow of FIG. 7, redundancy of the communication frame 50 can be carried out within the branch network 2 so as to carry out communication.

Specifically, in the branch network 2a of FIG. 1, when the communication frame 50 addressed to the communication terminal PC1 arrives at the communication apparatus M1 from the communication apparatus B1, two communication paths, from the communication apparatus M1 to the communication apparatus M2 via the communication apparatus M3, and from the communication apparatus M1 to the communication apparatus M2 via the communication apparatus M4, can be realized using the path table 35c of FIG. 13.

Thus, in the first embodiment, the communication apparatuses 4 arranged in the trunk network 1 operate in the trunk mode in which redundancy of the communication path is carried out for communication, in order to maintain real-timeness and a high data arrival rate. Meanwhile, the communication apparatuses 4 arranged in the branch network 2 operates in the branch mode in which the communication path can flexibly be changed according to a communication failure, in order to maintain a high data arrival rate. Therefore, according to the first embodiment, a communication apparatus and communication system in which real-timeness and a high data arrival rate are maintained can be provided.

Also, as described in the first and third embodiments, redundancy of communication paths can be realized based on the path table 35.

Also, according to the second embodiment, even when the trunk network 1 is divided, operation as a single trunk network is possible based on the path table 35.

Moreover, as described in the first embodiment, change of the operation mode (trunk mode or branch mode) of the communication apparatus 4 and change in the path table 35 can be executed by remote control from the management terminal 8. Therefore, communication paths in the communication system 100 can flexibly cope with changes in the wireless environment while maintaining real-timeness and a data arrival rate, based on an instruction from the management terminal 8.

DESCRIPTION OF REFERENCE NUMERALS AND SIGNS 1 trunk network
2 branch network
4 communication apparatus (relay communication network)
6 communication terminal
8 management terminal
20 wireless communication unit
25 wired communication unit
30 frame analyzing unit
31 redundancy processing unit
32 path control unit
33 setting changing unit
34 apparatus mode information
35 path table (communication channel information)
40 internal transmission path
50 communication frame
64 payload
100 multistage relay communication system
220 command
221 configuration control data
240 wired communication channel

The invention claimed is:

1. A relay communication apparatus with an address which is used for multistage relay and which, based on an address stored in a received communication frame, transfers the communication frame, the relay communication apparatus comprising:
   a storage unit which stores communication channel information in which an address of a transmission source and an address of a transmission destination of the communication frame are stored in association with an address of a transfer destination on a communication path of the communication frame;
   a communication unit which transmits and receives the communication frame;
   a frame analyzing unit which acquires the address of the transmission destination from the communication frame that is received; and
   a redundancy processing unit which, when addresses of two or more different transfer destinations on the communication path associated with the address of the transmission destination are acquired with reference to the communication channel information using the address of the transmission destination that is acquired, generates the communication frame which stores the address of the transfer destination and sequence information indicating that redundancy is carried out, for each of the addresses of the transfer destinations, and executes redundancy of the communication frame,
   wherein the storage unit further stores operation mode information indicating whether or not the apparatus itself belongs to a network where redundancy of the communication frame is carried out,
   wherein the frame analyzing unit transmits a notification of execution which causes the redundancy processing unit to execute redundancy of the communication frame, when operation mode information indicating that the apparatus itself belongs to a network where redundancy of the communication frame is carried out is stored, and
   wherein the redundancy processing unit receives the notification of execution from the frame analyzing unit and executes redundancy of the communication frame.

2. A relay communication apparatus with an address which is used for multistage relay and which, based on an address stored in a received communication frame, transfers the communication frame, the relay communication apparatus comprising:
- a storage unit which stores communication channel information in which an address of a transmission source and an address of a transmission destination of the communication frame are stored in association with an address of a transfer destination on a communication path of the communication frame;
- a communication unit which transmits and receives the communication frame;
- a frame analyzing unit which acquires the address of the transmission destination from the communication frame that is received; and
- a redundancy processing unit which, when addresses of two or more different transfer destinations on the communication path associated with the address of the transmission destination are acquired with reference to the communication channel information using the address of the transmission destination that is acquired, generates the communication frame which stores the address of the transfer destination and sequence information indicating that redundancy is carried out, for each of the addresses of the transfer destinations, and executes redundancy of the communication frame,
- wherein the communication unit includes:
- a wireless communication unit which transmits and receives the communication frame wirelessly,
- a wired communication unit which transmits and receives the communication frame via a wire,
- wherein the storage unit further stores operation mode information indicating whether or not the apparatus itself belongs to a network where redundancy of the communication frame is carried out,
- wherein the frame analyzing unit transmits a notification of execution which causes the redundancy processing unit to execute redundancy of the communication frame, when operation mode information indicating that the apparatus itself belongs to a network where redundancy of the communication frame is carried out is stored, and
- wherein the redundancy processing unit receives the notification of execution from the frame analyzing unit and executes redundancy of the communication frame.

3. A relay communication apparatus with an address which is used for multistage relay and which, based on an address stored in a received communication frame, transfers the communication frame, the relay communication apparatus comprising:
- a storage unit which stores communication channel information in which an address of a transmission source and an address of a transmission destination of the communication frame are stored in association with an address of a transfer destination on a communication path of the communication frame, and operation mode information indicating whether or not the apparatus itself belongs to a network where redundancy of the communication frame is carried out;
- a communication unit which transmits and receives the communication frame;
- a frame analyzing unit which acquires the address of the transmission destination and a notification of setting change designating change of one or both of the communication channel information and the operation mode information, from the communication frame that is received;
- a redundancy processing unit which, when addresses of two or more different transfer destinations on the communication path associated with the address of the transmission destination are acquired with reference to the communication channel information using the address of the transmission destination that is acquired, generates the communication frame which stores the address of the transfer destination and sequence information indicating that redundancy is carried out, for each of the addresses of the transfer destinations, and executes redundancy of the communication frame; and
- a setting changing unit which changes one or both of the communication channel information and the operation mode information based on the notification of setting change acquired by the frame analyzing unit.

4. The relay communication apparatus according to claim 3, wherein
the frame analyzing unit transmits a notification of execution which causes the redundancy processing unit to execute redundancy of the communication frame, when operation mode information indicating that the apparatus itself belongs to a network where redundancy of the communication frame is carried out is stored, and
wherein the redundancy processing unit receives the notification of execution from the frame analyzing unit and executes redundancy of the communication frame.

5. The relay communication apparatus according to claim 3 wherein
the relay communication apparatus includes a path constructing unit which, when operation mode information indicating that the apparatus itself belongs to a network where redundancy of the communication frame is carried out,
wherein the path constructing unit is connected to enable communication with a management device which holds path information to be set in the communication channel information, and
wherein the path constructing unit receives the path information to be set in the communication channel information from the management device, and updates the communication channel information.

6. The relay communication apparatus according to claim 3, wherein
the relay communication apparatus includes a path constructing unit which, when it is determined that response information to transmission of the communication frame is not received, and operation mode information indicating that the apparatus itself belongs to a network where redundancy of the communication frame is not carried out, exchanges information about connection state with another of the relay communication apparatus belonging to the network where redundancy of the communication frame is not carried out, and updates the communication channel information based on the exchanged information.

7. A multistage relay communication system in which a relay communication apparatus with an address is connected in multiple stages, the relay communication apparatus transferring, based on an address stored in a received communication frame, the communication frame, the multistage relay communication system comprising:
the relay communication apparatus including:
a storage unit which stores communication channel information in which an address of a transmission source and an address of a transmission destination of the communication frame are stored in association with an address of a transfer destination on a communication path of the communication frame, and operation mode information indicating whether or not the apparatus itself belongs to a network where redundancy of the communication frame is carried out;

a communication unit which transmits and receives the communication frame;

a frame analyzing unit which acquires the address of the transmission destination and a notification of setting change designating change of one or both of the communication channel information and the operation mode information, from the communication frame that is received;

a redundancy processing unit which, when addresses of two or more different transfer destinations on the communication path associated with the address of the transmission destination are acquired with reference to the communication channel information using the address of the transmission destination that is acquired, generates the communication frame which stores the address of the transfer destination and sequence information indicating that redundancy is carried out, for each of the addresses of the transfer destinations, and executes redundancy of the communication frame; and a setting changing unit which changes one or both of the communication channel information and the operation mode information based on the notification of setting change acquired by the frame analyzing unit, wherein the relay communication apparatus transmits and receives the communication frame to and from another of the relay communication apparatus.

8. The multistage relay communication system according to claim 7, wherein the relay communication apparatus includes a path constructing unit which, when operation mode information indicating that the apparatus itself belongs to a network where redundancy of the communication frame is carried out, the relay communication apparatus is connected to enable communication with a management device which holds path information to be set in the communication channel information, and the relay communication apparatus receives the path information to be set in the communication channel information from the management device, and generates the communication channel information.

9. The relay communication apparatus according to claim 4, wherein the relay communication apparatus includes a path constructing unit which, when operation mode information indicating that the apparatus itself belongs to a network where redundancy of the communication frame is carried out, wherein the path constructing unit is connected to enable communication with a management device which holds path information to be set in the communication channel information, and wherein the path constructing unit receives the path information to be set in the communication channel information from the management device, and updates the communication channel information.

10. The relay communication apparatus according to claim 4, wherein the relay communication apparatus includes a path constructing unit which, when it is determined that response information to transmission of the communication frame is not received, and operation mode information indicating that the apparatus itself belongs to a network where redundancy of the communication frame is not carried out, exchanges information about connection state with another of the relay communication apparatus belonging to the network where redundancy of the communication frame is not carried out, and updates the communication channel information based on the exchanged information.

* * * * *